United States Patent [19]

Li

[11] 4,149,616

[45] Apr. 17, 1979

[54] DECELERATION CONTROLLED BRAKE

[75] Inventor: Yao T. Li, Lincoln, Mass.

[73] Assignee: Massachusetts Institute of Technology, Cambridge, Mass.

[21] Appl. No.: 851,887

[22] Filed: Nov. 16, 1977

Related U.S. Application Data

[63] Continuation of Ser. No. 709,844, Jul. 29, 1976, abandoned, which is a continuation of Ser. No. 552,819, Feb. 25, 1975, abandoned.

[51] Int. Cl.² ............................................. F16D 65/14
[52] U.S. Cl. .................. 188/72.1; 188/72.7; 188/139; 192/35; 192/103 C
[58] Field of Search ................ 188/72.1, 71.2, 72.2, 188/72.7, 72.9, 135, 139, 140 R, 140 A, 181 T, 2 A, 26, 174, 346; 192/103 C, 35; 303/24 A, 24 C, 24 F

[56] References Cited

U.S. PATENT DOCUMENTS

| 746,831 | 12/1903 | Hayden | 188/140 R |
| 2,924,306 | 2/1960 | Martin | 303/24 C |
| 3,655,016 | 4/1972 | Watanabe | 188/2 A X |
| 3,677,375 | 7/1972 | Wolf | 188/72.7 X |

FOREIGN PATENT DOCUMENTS 714374  7/1965  Canada .................................. 188/140 A

*Primary Examiner*—George E. A. Halvosa
*Attorney, Agent, or Firm*—Arthur A. Smith, Jr.; Martin M. Santa

[57] ABSTRACT

A deceleration controlled and limited brake incorporates a deceleration sensor to limit the amount of braking torque which can be manually applied to a disc type brake. The deceleration sensor is a weighted lever which responds to deceleration by tending to disengage a disc clutch which the activated normal brake lever is engaging. The clutch force is applied at the end of a lever to provide the torque to engage the disc brake and provide deceleration of the vehicle containing the disc brake. Mechanical advantage together with deceleration control is provided by this clutch-brake assembly.

8 Claims, 5 Drawing Figures

DECELERATION CONTROLLED BRAKE

This application is a continuation of copending application Ser. No. 709,844, filed July 29, 1976 now abandoned, which is a continuation of Ser. No. 552,819, filed Feb. 25, 1975, now abandoned.

This invention relates in general to wheel braking devices. More particularly, the invention is a brake whose maximum braking force is controlled by the deceleration of the vehicle of which the wheel is a part.

BACKGROUND OF THE INVENTION

The maximum braking deceleration which may be obtained by braking of the front wheel on a bicycle and in lightweight motorcycles is limited by the "nose-over" of the vehicle and rider when the moment of the force of deceleration of the rider's body mass with respect to the ground contact point of the front wheel exceeds the stabilizing moment of the weight of the rider's body also with respect to the same point. For the usual bicycle design, the allowable deceleration force is approximately one-half the earth's gravitational force before nose-over occurs and this is substantially independent of the weight of the rider. There therefore exists a need for a brake capable of providing automatically no more than the maximum allowable deceleration force substantially independent of the manually applied braking force when the braking force exceeds that which would produce the desired maximum deceleration.

It is therefore an object of this invention to provide such a deceleration-force-controlled brake.

It is a further object of this invention to provide such a brake which is lightweight and inexpensive and hence suitable for use on a bicycle.

SUMMARY OF THE INVENTION

The deceleration controlled and limited brake of this invention incorporates a deceleration sensor and a manual control input force which defines the amount of deceleration desired. The difference between the control input force "signal" and the force "signal" produced by the deceleration sensor is the error signal. The error signal is then, through the mechanical amplification, used to control the brake to decelerate the vehicle and thereby reduce the error signal. The deceleration rate is in direct proportion to the control input as in a proportional type of feedback servomechanism control system. The maximum deceleration is determined by a limiting stop on the manual control input.

THE DRAWINGS

The invention, both as to its arrangement and mode of operation, can be better understood from the following dsecription in conjunction with the accompanying drawings in which FIG. 1 is a view of the brake of this invention on the front wheel of a bicycle.

THE INVENTION

Figure 1:
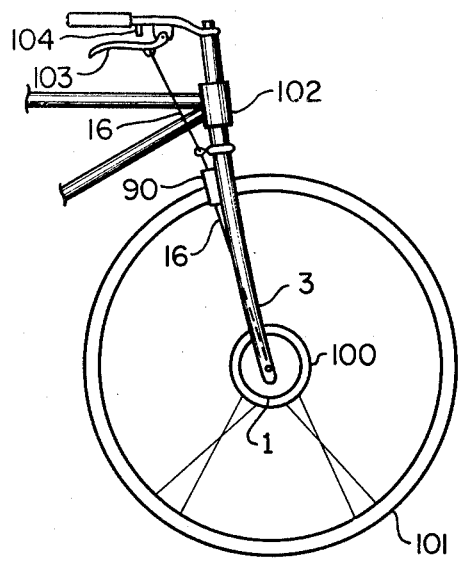

The brake assembly 100 of this invention is shown assembled to the front wheel 101 of a bicycle in FIG. 1. The invention is embodied in an improved form of disc brake where the disc 1 is shown in the figure. The brake is activated by pulling on cable 16 with brake lever 103. Spring assembly 90 limits the amount of tension and hence braking force which is applied to brake assembly 100. The deceleration-force-controlled brake of this invention is shown in a partial cross-section perspective view in FIG. 2. The disc 1 of the disc brake system used to illustrate this invention is an integral part of the hub assembly (not shown) of the front wheel. The disc 1, outlined by dashed lines, is represented as being transparent in order to show more clearly the novel features of the brake.

Figure 2:
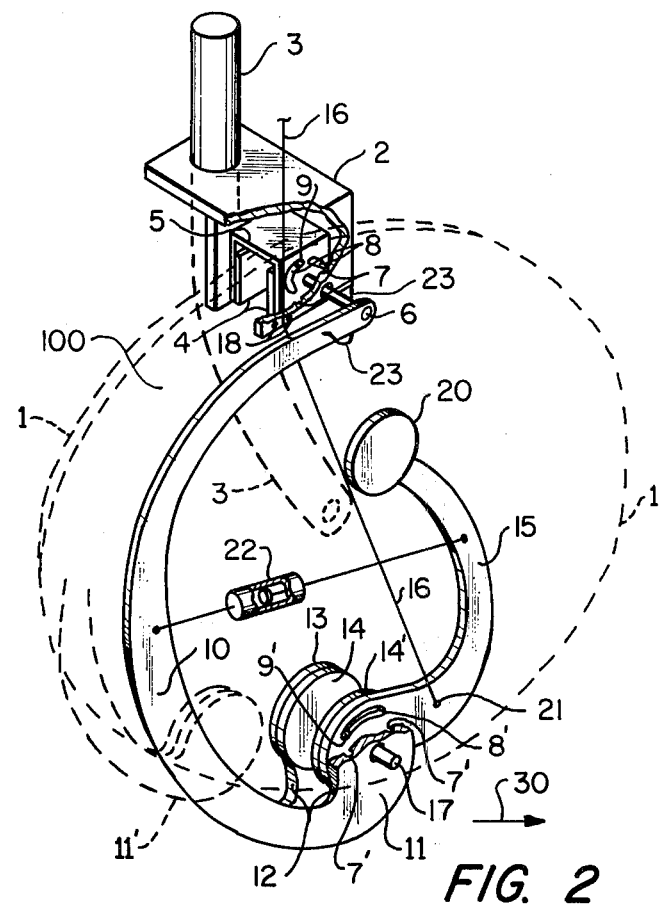
FIG. 2 is a detailed perspective view of the brake assembly of the invention.
Figure 3:
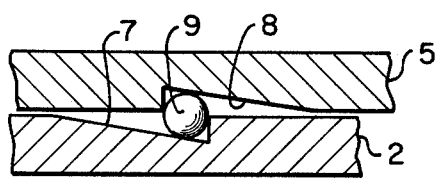
FIGS. 3 and 4 show a cross-sectional view of the races and their included ball when the brake is not engaged and engaged, respectively.
Figure 4:
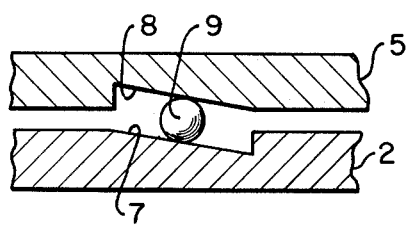
Figure 5:
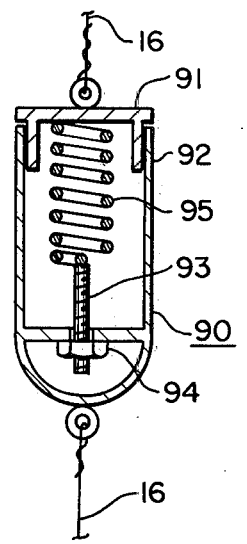
FIG. 5 shows a cross-sectional view of the tension spring assembly.

The main bracket, or caliper 2, of the brake is attached to one of the two struts 3 of the front wheel fork of the bicycle in order to transfer the braking force to the frame of the bicycle. A pair of brake pads 4 are attached to the inside surfaces of a U-shaped bracket 5. The pads 4 are on opposite sides of the disc 1 and are closely spaced from the disc when the brake is not applied. The bracket 5 is pivoted inside caliper 2 on shaft 6 which is rotatably mounted in caliper 2. The axis of shaft 6 is perpendicular to the plane of disc 1 and the pads 4. The inside surfaces of caliper 2 each contain three tapered ball races 7 two of which are shown in the cross-section of caliper 2. The races 7 lie on a circle concentric with the axis of the shaft 6 and each race occupies less than one-third of the circumference of the circle on which it lies. Similarly, there are three tapered races 8 (only one is shown in FIG. 2) on the outer surfaces of bracket 5. When the brake is not actuated, the deepest portion of race 7 is opposite a corresponding deepest portion of race 8 in the caliper. A ball 9 is placed in each pair of opposed races. When the brake is not being applied, each ball rests in the deepest portion of both the tapered races 7 and 8. Rotation of the shaft 6 causes bracket 5 to rotate with respect to caliper 2 thereby moving balls 9 along races 7 and 8 toward their shallower ends, and thereby bringing the pads 4 to move toward disc 1. An expanded cross-sectional view of the races 7 and 8 and ball 9 is shown in FIG. 3 for the disengaged condition and in FIG. 4 for the brake engaged condition. When the pads 4 make contact with the disc 1, the frictional braking force is transmitted through shaft 6 of the caliper 2 to strut 3. The top of bracket 5 is sufficiently flexible to allow the sides to which the pads 4 are mounted to move substantially parallel to each other toward the disc 1.

The shaft 6 is rotated by brake arm 10 which is actuated by rotary clutch assembly 11. The clutch assembly 11 comprises a U-shaped clutch bracket 12 which is attached to the end of brake arm 10. Clutch bracket 12 is rigid and comprises a backup clutch plate 13 with a clutch facing 14 which will engage the back surface of disc 1 when the clutch 11 is in operation. The rotary clutch 11 is controlled by clutch arm 15 which is hinged to the clutch bracket 12 by shaft 17. Clutch arm 15 and clutch bracket 12 have tapered races 7', 8' and balls 9', arranged as described earlier, to cause clutch facing 14' to move toward disc 1 when shaft 17 rotates in a counterclockwise direction. More specifically, the ball 9' is shown located in the deepest portion of both race 7' and race 8' for the condition where the clutch is unactuated.

The rotary clutch is engaged when the shaft 17 and the clutch arm 15 to which it is attached rotate in a counterclockwise direction in response to the pull of the cable 16 attached at point 21 to arm 15. The other end of cable 16 is attached to a conventional brake handle on the handlebar of the bicycle. The cable passes through guides 18 on caliper 2 to guide the cable 16 along the strut 3 to the brake handle.

The spring assembly 90 comprises a spring 95 attached to end cap 91 of casing 92. The other end of spring 95 is attached to a tensioning screw 93 which passes through the other end of the casing 92. A nut 94 on screw 93 pretensions the spring 95 to the maximum tension to which cable 16 is to be subjected. If greater tension than the spring 95 pretension is applied by brake lever 103, end cap 91 extends spring 95 sufficiently to cause the lever to hit stop 104 without the tension in cable 16 significantly exceeding the pretension value.

A weight 20 is attached to the upper end of the clutch arm 15. The weight 20 serves as an acceleration sensor. In the operation of the brake, when cable 16 is pulled upward by the brake handle, the arm 15 rotates in a counterclockwise direction to cause the clutch assembly 11 to become engaged. It is assumed that the bicycle when travelling in a forward direction, as shown by arrow 30, causes the brake disc 1 to rotate in a clockwise direction. The engagement of the clutch causes the clutch assembly 11 to move clockwise to position 11' shown on the figure. Therefore arm 10 will turn shaft 6 in a clockwise direction to engage the brake. However, simultaneously because of the consequent deceleration of the bicycle, the weight 20 will produce a deceleration force which tends to move arm 15 in a clockwise direction which is in the direction to release the clutch and hence the brake. According to the well established feedback control principle, the deceleration of the bicycle is thus proportional to the tension applied to cable 16. With a stop 104 limiting the maximum movement of the brake handle 103 and the spring assembly 90, the maximum tension applied to cable 16 is limited and consequently the maximum deceleration may be limited to a value such as one-half the acceleration of gravity.

In accordance with good servomechanism practice, an air damper 22 should be connected between brake arm 10 and clutch arm 15. The weight 20 and arm 15 are balanced above the shaft 17 to minimize the effects produced by the vertical motion of the front wheel. Spring 23 acts to restrain brake arm 10 against motion except when the brake is applied. Bracket 5 can have other embodiments which provide parallel motion of the pads 4, for instance, the sliding pin mechanism found in conventional automobile disc brakes.

Having described several embodiments of the invention, it is believed obvious that other modifications and variations of the invention are possible in the light of the above teachings. It is therefore to be understood that changes may be made in the particular embodiment of the invention described which are within the full intended scope of the invention as described by the appended claims.

What is claimed is:

1. A deceleration-controlled disc-type brake for braking the wheel of a vehicle comprising:
   a disc brake including,
   a disc attached to said wheel,
   a brake lever,
   a clutch,
   means for engaging said clutch to said disc in response to an applied force produced on said clutch by actuation of the brake lever connected to the clutch,
   means for connecting said clutch to said brake in a manner to cause said brake to become engaged to said disc when said clutch is engaged,
   means connected to said clutch responsive to the deceleration of the vehicle to provide a deceleration force for disengaging said clutch in opposition to the force applied to the clutch engaging means,
   the net braking force applied to the brake is the difference between the applied force and the deceleration force as amplified by the clutch means.

2. The brake of claim 1 comprising in addition
   spring means for limiting the applied force serially connected between said brake lever and said clutch engaging means.

3. The brake of claim 2 wherein said spring means comprises a
   pretensioned spring, pretensioned to the maximum desired applied force and capable of being extended when said maximum force is exceeded,
   said serial connection between said brake lever and said clutch engaging means transmitting the force produced by the brake lever to said clutch engaging means, said force tending to extend said spring and being limited to substantially the force required to pretension said spring.

4. The brake of claim 3 comprising in addition
   a damping means connected between said deceleration responsive means and said means for connecting said clutch to said brake.

5. A deceleration-controlled disc-type brake for braking of the wheels of a vehicle comprising,
   a brake lever,
   a disc attached to said wheel,
   a brake comprising a brake housing secured to the vehicle, a brake arm rotatably attached to the housing at one end of said arm, said one end having a brake friction pad attached thereto, said brake pad moving into frictional contact with said disc to provide braking upon one direction of rotation of said brake arm,
   a clutch comprising a clutch arm rotatably attached at one end to the other end of said brake arm, a clutch friction pad attached to said one end of said clutch arm and adapted to make frictional contact with said disc upon one direction of rotation of said clutch arm with respect to said brake arm, a weight attached to the other end of said clutch arm,
   a cable,
   said brake lever being connected by said cable to said clutch arm to cause said clutch arm to rotate in said one direction to engage said clutch pad with said disc when said brake lever is moved to a braking position by an applied force, said brake lever thereby transmitting a force through said cable to said clutch arm,
   the frictional force on said clutch pad being transmitted at the point of rotational attachment of said clutch and brake arms to said brake arm to cause said brake arm to rotate in said one direction to frictionally engage said brake pad to said disc and thereby brake said wheel and thereby decelerate said vehicle.
   said clutch arm weight being responsive to said deceleration to produce a force on said clutch arm in a direction opposite that produced by said cable on said clutch arm by the actuation of said brake lever.

6. The brake of claim 5 comprising in addition means for limiting the applied force serially connected between said brake lever and said clutch arm.

7. The brake of claim 6 wherein said limiting means comprises a pretensioned spring, pretensioned to the maximum desired applied force and capable of being extended when said maximum force is exceeded, said pretensioned spring being serially connected with said brake lever, cable, and clutch arm to transmit the braking force produced by the brake lever to said clutch arm, said force tending to extend said spring and being limited to substantially the force required to pretension said spring.

8. The brake of claim 7 comprising in addition a damping means connected between said brake arm and said clutch arm.

* * * * *